Oct. 7, 1930.  H. T. KRAFT  1,777,315
STEERING WHEEL
Filed June 7, 1930  2 Sheets-Sheet 1

INVENTOR
*Herman T. Kraft.*
BY
*Evans & McCoy*
ATTORNEYS

Oct. 7, 1930.    H. T. KRAFT    1,777,315
STEERING WHEEL
Filed June 7, 1930    2 Sheets-Sheet 2
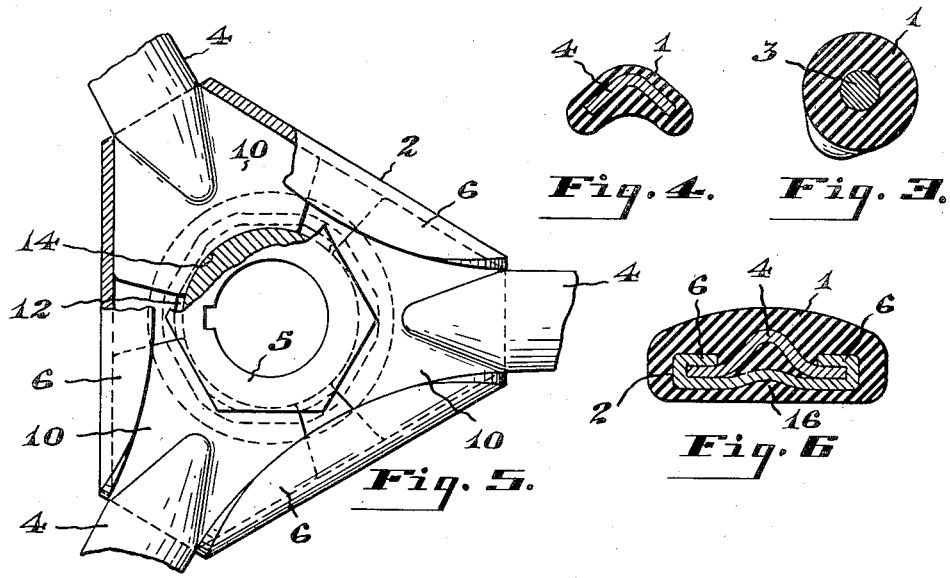
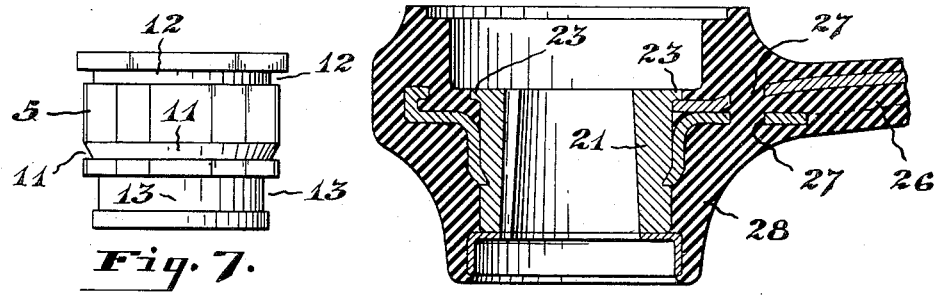
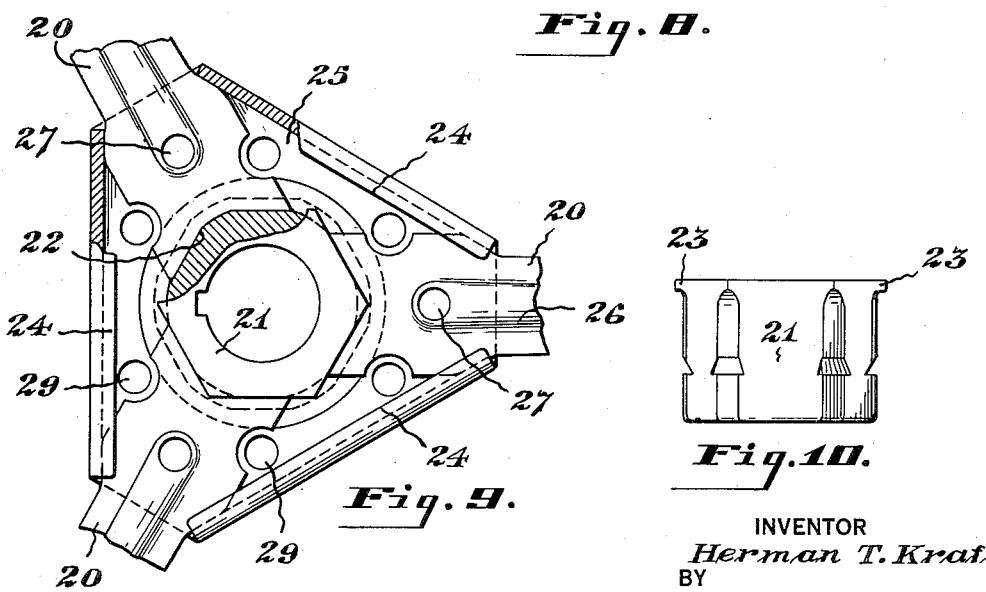
INVENTOR
*Herman T. Kraft.*
BY
*Evans + McCoy*
ATTORNEYS Patented Oct. 7, 1930

1,777,315

UNITED STATES PATENT OFFICE

HERMAN T. KRAFT, OF AKRON, OHIO, ASSIGNOR TO THE H. A. HUSTED COMPANY, OF DETROIT, MICHIGAN, A CORPORATION OF MICHIGAN

STEERING WHEEL

Application filed June 7, 1930. Serial No. 459,627.

This invention relates to steering wheels, and particularly to steering wheels of the reinforced composition type.

One of the objects of the present invention is to provide a reinforced composition steering wheel of improved design having relatively great strength and which can be economically manufactured.

Another object is to provide a reinforcing spider for composition steering wheels which can be easily and economically manufactured from sheet metal parts with considerable saving in the metal thereof.

Another object is to provide a reinforcing spider for composition steering wheels formed of separate parts which can be easily assembled as a unit without the use of bolts, rivets or like securing means.

Another object is to provide a reinforcing spider for composition steering wheels, including spoke elements so shaped and secured to a hub element as to have relatively great strength at the hub thereof.

Another object is to provide a reinforcing spider for composition steering wheels, embodying separate metal spokes secured to a separate hub element, wherein the unit stress at the hub is materially less than in steering wheel reinforcing spiders previously known.

A further object is to provide a reinforcing spider for a composition steering wheel wherein the spokes have progressively greater strength from the rim toward the hub whereby to permit uniform bending of the spokes in the event of an accidental crash and to thereby prevent breakage of the spokes.

With the above and other objects in view which will be apparent from the following detailed description, the present invention consists in certain features of construction and combinations of parts which will be readily understood by those skilled in the art to which the invention appertains.

In the accompanying drawings which illustrate suitable embodiments of the invention, Figure 1 is a plan view of the steering wheel, portions of the same being broken away to show the reinforcing spider embedded therein.

Fig. 3 is an enlarged section of the steering wheel rim taken on the line 3—3 of Fig. 1.

Fig. 4 is an enlarged transverse section of one of the spokes taken on the line 4—4 of Fig. 1.

Fig. 5 is a fragmentary plan view of the central hub portion of the reinforcing spider showing the method of securing the spokes to the hub plate.

Fig. 6 is a transverse section taken on the line 6—6 of Fig. 2.

Fig. 7 is a side elevation of the separate hub member for the steering wheel shown in Fig. 1.

Fig. 8 is an axial section taken through the hub portion of a modified type of steering wheel.

Fig. 9 is a fragmentary plan view of the central portion of the reinforcing spider used in connection with the steering wheel shown in Fig. 8.

Fig. 10 is a side elevation of the hub unit used in connection with the steering wheel shown in Fig. 8.

Figure 1:
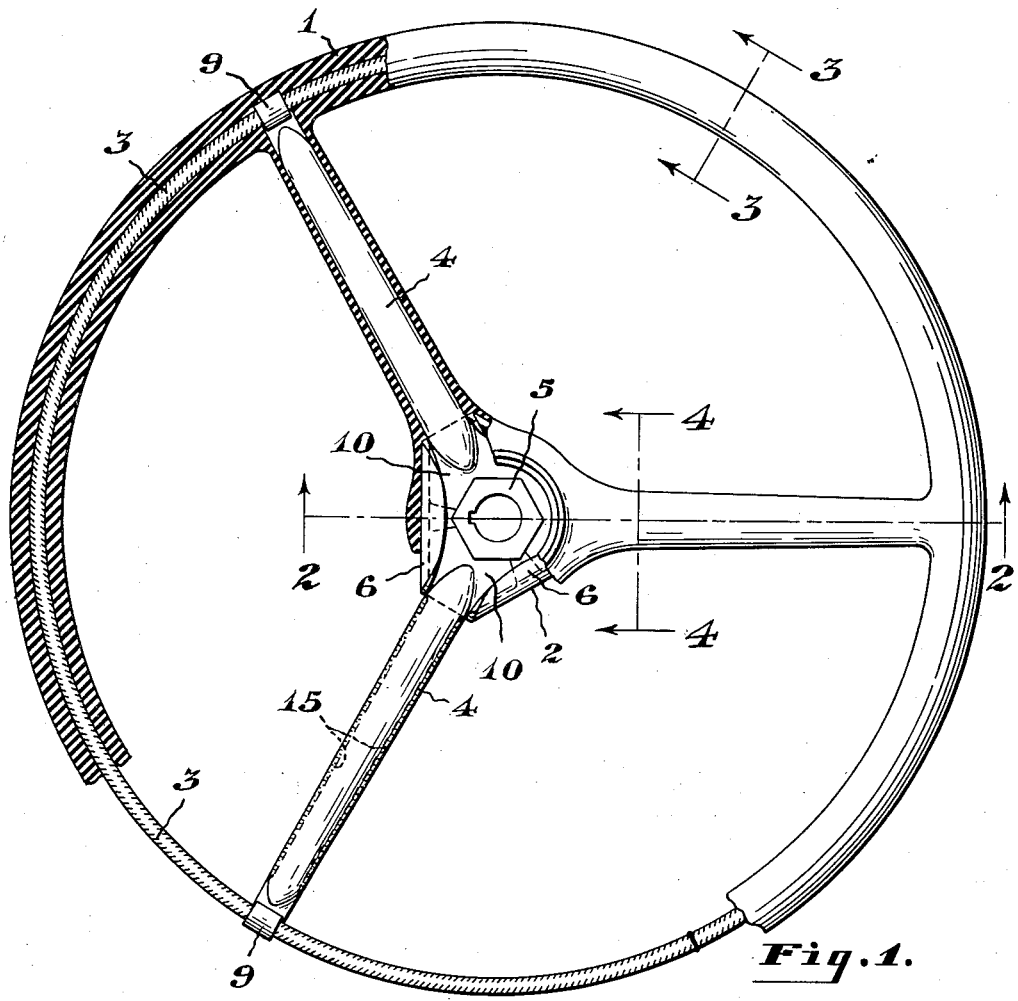

Referring to the accompanying drawings in which like numerals refer to like parts throughout the several views, the steering wheel of the present invention comprises a reinforcing spider embedded in a body 1 of initially plastic composition material.

The reinforcing spider shown in Figs. 1 to 7, inclusive, embodies a hub plate 2, a rim 3, spokes 4 connecting the hub plate and rim, and a hub 5 carried by the hub plate in engagement with the inner ends of the spokes 4.

The rim 3 is formed from a piece of suitable bar steel, preferably of circular cross-section, bent into circular form and having its ends securely welded together. As shown in the drawings, the rim 3 is preferably knurled to provide a good adhesion of the surrounding composition material thereto.

The hub plate 2 is stamped from sheet metal to a substantially triangular shape, to provide spoke supporting portions arranged substantially 120 degrees apart. Each side of the hub plate 2 is formed with an arcuate flange 6 intermediate its ends, adjacent ends of the flanges 6 being spaced apart to receive the spokes therebetween. Each flange portion 6, as shown in Fig. 5, extends at an angle of substantially 60 degrees to the radial axes of adjacent spoke supporting portions.

The hub plate 2 is provided with central hub receiving opening 7 of polygonal shape, the surrounding metal of which is bent downwardly to provide a continuous axial flange 8 which telescopically receives the hub element 5.

The spokes 4 are each stamped to shape from a blank of sheet metal, and have flat tongue portions 9 at their outer ends clinched around the rim 3, and flat inner ends 10. The sides of the inner spoke end diverge toward the center of the spider at an angle of substantially 120 degrees so that when the spokes are assembled to the hub plate 2 the divergent sides lie between the flanges 6 of the hub plate in engagement therewith, the flanges 6 being clinched over the inner ends 10 of the spokes to rigidly secure them to the hub plate 2. It is to be noted in Fig. 5 that each hub plate flange 6 lies between and is clinched over the inner ends 10 of the pair of adjacent spokes 4.

The hub 5 is of hexagonal shape, it being formed from a bar of hexagonal steel stock, and has the intersections of its sides rounded off to nearly their full length, providing overlying portions at their upper end. A circumferential groove 11 having a straight lower side wall is formed around the hub element intermediate its ends, into which the raw edges of the depending hub plate flange 8 are pressed to prevent relative axial movement of the hub element 5 and hub plate 2. A circumferential depression 13 is preferably formed in the hub element 5 below the groove 11 to receive the surrounding composition material. A narrow circumferential groove 12 is also formed around the upper end of the hub element 5 immediately adjacent the overlying portions thereof. This groove 12 is of substantially the same width as the thickness of the spoke material.

The marginal edge of the inner end 10 of each spoke is formed with an arcuate recess 14 which engages the bottom of the groove 12 of the hub element, the faces of the inner end 10 of each being received between the walls of the groove 12.

Figure 2:
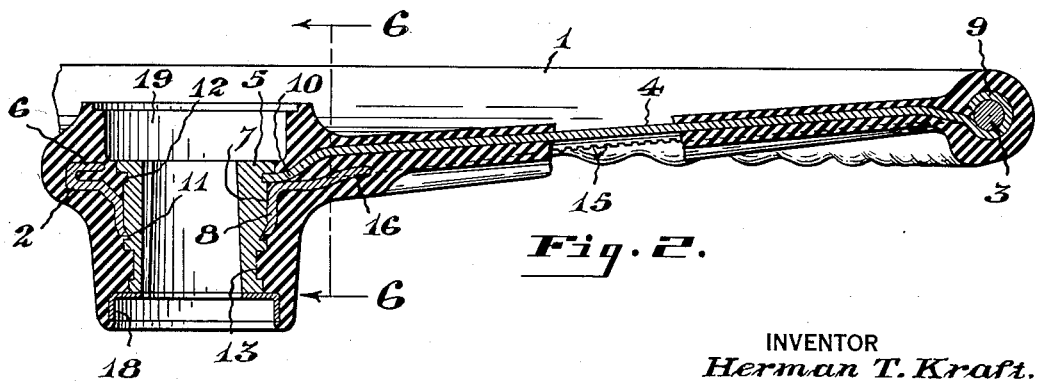
Fig. 2 is an enlarged transverse section taken on the line 2—2 of Fig. 1, a portion of the composition material being broken away.

The spokes 4 are of inverted V-shape substantially throughout their entire length, and the V portion of each spoke gradually merges into the flat tongue 9 and into the flat inner end 10 above the spoke supporting portion of the hub plate 2, as shown in Fig. 2. The V-shaped body portion of each spoke 4 gradually decreases in cross-sectional area from the inner to the outer end thereof, thereby providing for uniform bending throughout its length.

By spacing the bottom of the V-shaped portion of each spoke above the hub plate 2, and by virtue of the fact that the inner end of the spoke is received by the groove 12 in the hub 5, a couple action is provided whereby when the rim is vertically loaded, the inner end of the spoke will substantially fulcrum over the edge of the hub plate. This greatly reduces the local stress, which is usually resisted by rivets, welds, bolts or the like, and reduces the unit stress at this section of the spoke. The marginal edges of each spoke are preferably roughened or provided with notches 15 to assist in obtaining a good adhesion of the composition material thereto.

The hub plate flanges 6, before the assembly of the spokes to the hub plate 2, extend upwardly perpendicular to the hub plate. In assembling the parts of the spider together, the hub plate 2 is positioned in a suitable die with the hub 5 partially telescoped with the depending hub plate flange 8. The stamped spokes are next superposed on the hub plate 2 between the upstanding hub plate flanges 6 with their inner ends seated in the upper circumferential groove 12 of the hub element 5, with their divergent inner side edges seating against the hub plate side flanges 6. The radial portions of the hub plate 2 are upwardly depressed at 16 below the radial axes of the spokes to provide means for centering the hub plate 2 in the assembling die. The formed rim 3 is finally positioned on the flat tongues 9 at the outer ends of the spokes.

The initial movement of the assembly die drives the hub member 5 relative to the hub plate 2, bringing the spokes 4 into rigid seating engagement with the hub plate, by reason of the inner ends of the spokes being received in the groove 12 of the hub element 5. The raw free edges of the depending hub plate flange 8, during this initial movement of the assembly die, are driven into the circumferential groove 11, to thereby anchor the hub element 5 in the hub plate 2. The next operating movement of the assembly die securely clinches the tongues 9 of the spokes 4 around the rim 3, and at the same time turns the hub plates 6 inwardly and downwardly against the inner ends 10 of the spokes 4. This securely clamps the spokes against the hub plate, and because of the divergent spoke sides and the angular hub plate sides, has the tendency to drive the spokes against the hub element 5 and true up the spider. The spider is thus completely assembled as a unit in a very simple operation and does not require the use of the customary bolts, welds or rivets to secure the several parts together.

The spider thus assembled is now in condition to be embedded in a body of composition material, and is positioned in a molding cavity with the hub element 5 seated on and in axial alignment with a sheet metal cup portion 18, which forms the counter bore of the conventional steering wheel. Initially plastic composition material moldable when subjected to heat and pressure, is then molded around the spider and cup portion 18. As shown in Figs. 1 and 2, the composition material completely embeds the spider with the ends of the hub element 5, and is formed with a relatively large recess 19 above the upper end of the hub element 5 to provide a housing for such items of control as spark, gasoline and light mechanism.

In Figs. 8, 9 and 10, a modified type of structure is shown. In this construction, the inner ends of the spokes 20 are formed with substantially V-shaped notches 22 which engage the intersecting sides of the hub element 21. The overlying portions 23 of the hub element 21 extend over the inner ends of the spokes 20 to assist the hub plate flanges 24 in clamping the spokes against the hub plate 25.

The spokes 20 are formed with downwardly presenting or downwardly facing depressions 26 which merge into the inner ends of the spokes above the hub plate 25 to materially reduce the stress in the spokes above the edge of the hub plate. Aligned openings 27 are formed in the hub plate 25 and the spokes 20 so that the surrounding composition material 28 may extend therethrough and assist in securing the spokes and hub plate together. The composition material is also united at opposite sides of the hub plate through additional openings 29 formed therein adjacent the sides of the inner ends of the spokes.

In the construction described, the irregular design of the assembled spider unit permits the composition material to flow in all the crevices of the structure. Any radial motion of the spokes imposes a compressive force within the hub portion.

The V-shaped spoke elements being gradually reduced in cross-sectional area from the hub to the rim, form a spoke member of such characteristics that any axial loading on the rim of the wheel tends to eliminate localized bending. During bending, the spokes take a gradual deflection representing a sine curve which materially assists in the prevention of surface cracks in the surrounding body of material.

The V-shaped form of spoke in addition to many other advantageous characteristics, permits the molding of the composition material with a depression on the under side of the spokes, which effects a saving in the quantity of composition material. The particular spoke sections described also are very advantageous in that unit stresses therein at their points of attachment to the hub are materially reduced.

The reinforcing spiders described are very simple in construction and for this reason can be easily and economically manufactured and assembled.

Aside from the specific embodiments of the invention herein shown and described, it will be understood that numerous details of construction may be altered and omitted without departing from the spirit and scope of this invention, and it is not intended to limit the invention to the exact construction set forth, as it is desired to claim the invention broadly as well as specifically, as indicated in the appended claims.

What I claim is:

1. In a steering wheel, a reinforcing spider comprising a hub supporting plate, a hub carried by said hub supporting plate, and a plurality of spokes, each spoke having inner end portions in abutting engagement with and rigidly secured to said hub supporting plate and a transversely-arched portion merging into said inner end portions, said arched portion being spaced from said hub supporting plate to provide means for distributing bending stresses over a substantial length of the spoke portion adjacent said hub supporting plate.

2. In a steering wheel, a reinforcing spider comprising a hub supporting plate, a hub carried by said hub supporting plate and having a peripheral shoulder, and a plurality of separate spoke elements, each spoke element having its extreme inner edge underlying said peripheral shoulder, and also having inner end portions adjacent said extreme inner edge rigidly secured to said hub supporting plate and a transversely arched portion merging into said inner end portions, said arched portion being spaced from said hub plate and extending into the body of the spoke well beyond said hub plate to provide means for distributing bending stresses over a substantial length of the spoke portion adjacent said hub supporting plate.

3. In a steering wheel, a reinforcing spider comprising a hub supporting plate, a hub carried by said hub supporting plate and a plurality of spoke elements, each spoke element having inner end portions in engagement with said hub plate and a transversely-arched portion merging into said inner end portions, said arched portion being spaced from said hub plate, and said hub supporting plate having the metal at its edges between said spoke elements folded over the edges of said inner end portions to rigidly clamp the said inner end portions to said hub supporting plate.

4. In a steering wheel, a reinforcing spider comprising a hub supporting plate, a hub carried by said hub supporting plate and a plurality of spoke elements, each spoke element having inner end portions in engagement with said hub plate and a transversely-arched portion merging into said inner end portions, said arched portion being spaced from said hub plate, the outer edges of said inner end portions of each spoke element being divergent toward the axis of said wheel, the metal at the edges of said hub supporting plate lying between said spoke elements being folded over said inner end portions and being in engagement with said divergent edges to rigidly secure said spoke elements to said hub supporting plate and prevent longitudinal movement of said spoke elements away from the axis of said wheel.

5. In a steering wheel, a reinforcing spider comprising a hub plate, a hub carried by said hub plate and having a peripheral shoulder, and a plurality of separate spoke elements, each spoke element having its inner extremity underlying said shoulder and also having inner end portions adjacent said inner extremity seated on said hub plate, the outer side edges of said inner end portions being divergent toward the axis of said wheel and a transversely-arched portion spaced from said hub plate and integrally merging into said inner end portions, the metal at the edges of said hub plate between said spoke elements being folded over said inner end portions and in engagement with said divergent side edges to rigidly secure said spoke elements to said hub plate and to securely wedge said spoke elements against said hub to thereby prevent longitudinal movement of the spoke away from said hub.

6. In a steering wheel, a reinforcing spider comprising a hub plate, a hub supported thereby, and a plurality of spoke elements resting on said hub plate, said spoke elements being deformed to provide longitudinal depressions therein forming transversely arched portions overlying and spaced from the radially outer edge portions of said hub plate, and means rigidly securing said spokes to said hub plate along the side edges of said spokes to provide a pocket between said hub plate and said overlying spoke elements for receiving moldable composition material therein and for distributing bending stresses in the spoke elements adjacent said hub plate.

7. In a steering wheel, a reinforcing spider comprising a hub plate, a hub supported thereby, and a plurality of spokes having widened inner ends overlying and resting on said hub plate, said spokes being deformed to provide longitudinal depressions forming transversely arched portions overlying the hub plate at said inner end portions and spaced from said hub plate adjacent the outer edge portions thereof, the metal at the edges of said hub plate between said spokes being folded over said widened inner ends of the spokes adjacent the edges of said depressions to directly engage the upper face of and rigidly secure said inner ends of said spokes at the edges of said transversely arched portions to said hub plate.

8. In a steering wheel, a sheet metal hub and spoke supporting plate, a hub element mounted on said plate, a plurality of separately formed metal spokes positioned on said plate, flanges on said hub plate folded over the sides of said spokes at the inner ends thereof to directly engage the faces of and rigidly secure said spokes to said plate, means on said hub element overlying the inner extremities of said spokes to hold said extremities against movement axially of said hub element, each spoke having a longitudinal depression therein forming transversely arched portions spaced from and overlying said hub plate, said longitudinal depressions terminating adjacent the extreme inner ends of said spokes, a continuous rim rigidly connected to the outer ends of said spokes, and a body of moldable composition material conforming in shape to the finished wheel and encasing said rim, spokes, and hub and spoke supporting plate, said composition material filling the pockets provided between the transversely arched portions of said spokes and said supporting plate.

9. In a steering wheel, a sheet metal hub and spoke supporting plate, a hub element mounted on said plate, a plurality of separately formed metal spokes positioned on said plate, flanges on said hub plate folded over side portions of said spokes at the inner ends thereof to directly engage the faces of said side portions and rigidly secure said spokes to said plate, each of said spokes being of V-shape in cross section with the widest portions of said spokes overlying said hub plate and spaced therefrom over the transversely arched portions to form pockets between the end portions of the spokes and said supporting plate, said spoke elements being of uniformly decreasing cross sectional area between the supporting plate and the rim, means for securing the inner extremity of each spoke against said plate, a continuous rim rigidly connected to the outer ends of said spokes, and a body of moldable composition material conforming in shape to the finished wheel and encasing said rim, spokes and hub and spoke supporting plate and filling the pockets formed between the transversely arched portions of the spokes and the hub plate.

10. In a steering wheel, a reinforcing spider comprising a sheet metal hub plate, a hub core carried by said plate, a plurality of sheet metal spoke elements, and an endless rim member carried by said spoke elements, each of said spoke elements comprising a transversely arched portion overlying the marginal edge portion of said hub plate and provided with outwardly extending wing portions in face to face contact with said hub plate, marginal edge portions of said hub plate being folded over portions of said wing portions, and means for anchoring the inner extremities of each of said spoke elements.

11. In a steering wheel, a reinforcing spider comprising a hub plate, a hub carried by said hub plate and having peripheral shoulder portions, and a plurality of separate spoke elements spaced apart at their inner ends, each spoke element having its inner extremity underlying and securely held against said hub plate by said peripheral shoulder portions, the inner ends of said spokes being transversely arched away from the hub plate and widened to form lateral shoulder portions extending outwardly from the arched portions and disposed in face to face contact with said hub plate, the metal at the edges of said hub plate intermediate said spokes being flanged into engagement with said shoulder portions to secure said spokes radially against said hub and provide a uniform spacing of said spokes, said flanged metal being folded parallel to the shoulder portions of said spoke elements, and directly engaging the faces of and rigidly securing said shoulder portions to said hub plate.

12. In a steering wheel, a reinforcing spider comprising a hub supporting plate, a hub carried by said hub supporting plate and a plurality of spoke elements, each spoke element having inner end portions in engagement with said hub plate and a transversely arched portion merging into said inner end portions, the outer edges of said inner end portion of each spoke element being divergent toward the axis of said wheel, the metal at the edges of said hub supporting plate lying between said spoke elements being folded over said inner end portions and being in engagement with said divergent edges to rigidly secure said spoke elements to said hub supporting plate and prevent longitudinal movement of said spoke elements away from the axis of said wheel, portions of said hub plate being pressed into said transversely arched portions of said spoke elements.

In testimony whereof I affix my signature.

HERMAN T. KRAFT.